Jan. 30, 1962     G. DIRKS     3,018,960
ELECTRONIC ADDER-SUBTRACTOR APPARATUS
EMPLOYING A MAGNETIC DRUM

Filed Feb. 26, 1957            10 Sheets-Sheet 1

INVENTOR.
Gerhard Dirks
BY
Michael S. Striker
Attorney

INVENTOR.
Gerhard Dirks
BY
Michael S. Striker
Attorney

Jan. 30, 1962   G. DIRKS   3,018,960
ELECTRONIC ADDER-SUBTRACTOR APPARATUS
EMPLOYING A MAGNETIC DRUM
Filed Feb. 26, 1957   10 Sheets-Sheet 5

INVENTOR.
Garland Dirks
BY
Michael S. Striker
Attorney

United States Patent Office 3,018,960
Patented Jan. 30, 1962

3,018,960
ELECTRONIC ADDER-SUBTRACTOR APPARATUS EMPLOYING A MAGNETIC DRUM
Gerhard Dirks, 44 Morfelder Landstrasse,
Frankfurt am Main, Germany
Filed Feb. 26, 1957, Ser. No. 642,563
Claims priority, application Great Britain Jan. 29, 1957
11 Claims. (Cl. 235—176)

This invention refers to an electronic adder-subtractor apparatus employing a magnetic drum or equivalent wherein digit and numerical values either in coded or uncoded form can be represented by pulses.

It is an object of the invention to provide an electronic adder-subtractor employing a magnetic storage device wherein means for the generation of two or more pulse trains of different timings and means for counting pulses in more than one of such trains simultaneously in dependence on respective digit values so as to totalize the counted pulses from those trains.

The pulses in each train may have a definite timed relationship with those in the other trains, and the difference between the timings in the several trains may be such that no identity will occur between the time instant of a pulse in one train and the time instant of a pulse in any other train, so that a single counter may receive and totalize the pulses from a plurality of trains.

All the pulse trains may be derived from the same source, and they may for example arise out of a common relative movement between a pulse generating means and sensing means.

Each pulse train may be a continuous pulse train and be effective only for the period of counting, or each pulse train comprises a determined number of pulses dependent on the digit value to be counted.

It is another object of the invention to arrange for the several pulse trains to be generated by a corresponding number of sensing means shifted with respect to each other, between which sensing means and one or more signal generators there is a relative movement. Alternatively, the several pulse trains may be generated by a number of signal generators shifted with respect to each other, between which and a corresponding number of sensing means there is a relative movement.

The said signal generators may be inductive generators and may for example comprise permanent magnets carried in non-magnetic material, or may comprise interruptions in a homogeneous magnetic material, or may comprise teeth on a wheel or disc, or they may comprise recorded signals.

In other embodiments of the invention the said signal generators are optical generators, and may for example include optical markings of different reflectivity, or optical markings having a different transparency.

Again, the said signal generators may be capacitive generators cooperating with corresponding capacitive sensing means. They may for example comprise conductors having a voltage potential different from their surroundings, and/or they may be screened with a zero or other stabilized potential.

In still other cases, the said signal generators may be contact generators.

In the said cases where there is a relative movement associated with the signal generators, a common relative movement between pulse generators and sensing means may be a synchronized or directly coupled movement, or may be a movement between the same relatively moving parts, and signals controlling the relative movement may be derived from a relative movement between sensing means and such record means operating in synchronism with a record means.

In accordance with the present invention, there is a single pulse generator the pulses from which are derived by doubling or other multiplying means, for example rectifiers, multivibrators or the like.

It is another object of the invention to provide an electronic adder-subtractor employing a magnetic drum or other storage device wherein the calculating procedure is divided into two or more working stages, whereby in one working stage the number value represented by pulses are processed in a single counting stage in order to obtain a result, while in the second working stage the signals indicating the result are fed from the said counting stage to a store or to another recording or indicating arrangement, with the production of a carry-over signal if necessary. The result signals may be returned as pulses from the counting stage to the same storage means from which the digit signals to be processed were taken.

In order that the invention may be readily carried into effect, it will now be described with reference to the accompanying drawings, wherein.

Figure 1:
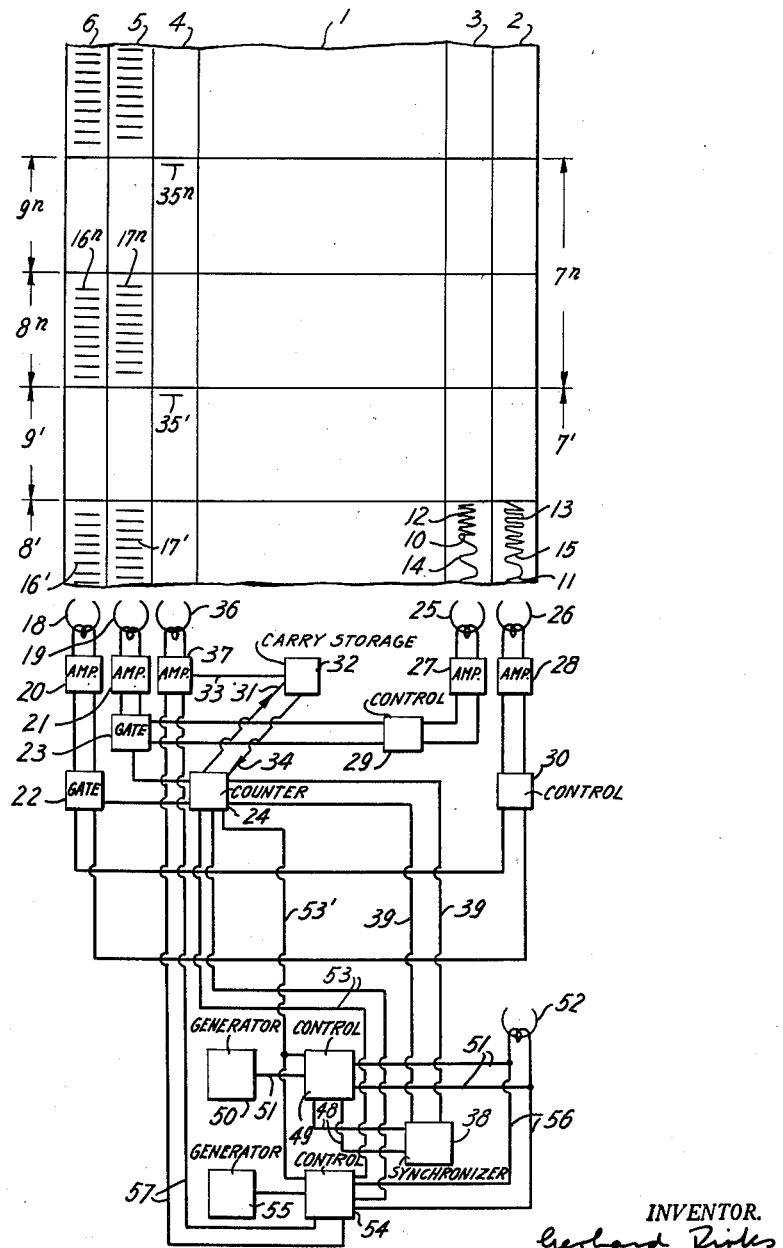
FIG. 1 is a schematic circuit diagram of one embodiment of the invention.

Referring first to FIG. 1, the arrangement includes the drum 1 (a part only of which is shown) which is mounted on shaft $1b$ and driven by motor $1a$, the cylindrical surface of the drum being provided with a magnetizable layer. This surface is notionally subdivided into the separate signal tracks 2–6. The tracks 2 and 3 represent storage tracks, in which the different numbers for a computation are represented. That is, they are erasible storages shown in the form of storage tracks of a drum, but in other embodiments there may of course be other forms of storage elements known in the art. On these storage tracks 2, 3, operands, may have been recorded previously by an input device not shown in the drawings.

The recording areas 4, 5 and 6 have permanent recordings for the generating of pulses. These recordings may be either effected by alterations of the magnetic state of the surface of the rotating drum, or the pulses may be generated by thin permanent magnets arranged within slots in a non-magnetic body of drum 1. In either case, the recordings are sensed by signal heads.

The signal tracks 2 to 6 extend around the circumference of the drum 1 and are subdivided in a circumferential direction into single sectors $7^{1-n}$ one of these sectors being provided for each denomination of a number which is to be processed. Each of these sectors $7^{1-n}$ is again subdivided into two sub-sectors $8^1, 9^1,$ to $8^n, 9^n$.

Within the sub-sectors $8^1$–$8^n$, each in its own denomination, there are recorded the digit values of the numbers which have to be processed. This recording, in the example illustrated, is effected by frequency recordings of different lengths, as shown in more detail within the sub-sector $8^1$. As shown, the first part of the sub-sector $8^1$ has in the two storage tracks 2 and 3 a low-frequency recordings 14, and 11, whereas the second part of the sub-sector $8^1$ has a high-frequency recording 12, and 13, which might also be an area erased by a high frequency. The position occupied by the changes of frequency, 10 and 15, which divide the recorded area from the erased area, form relatively to the ends of the sub-sector $8^1$ the indication of the digit value which is recorded within this denomination.

Within each of the sub-sectors $8^1$ to $8^n$, and in the two tracks 5 and 6 are recorded pulse groups $16^{1-n}$ in track 6 and $17^{1-n}$ in track 5, each group including "9" pulses. The pulses of the pulse group $16^{1-n}$ are arranged in such a way that they are staggered with respect to the pulses of the pulse group $17^{1-n}$ by half the distance between two consecutive pulses in the same group. Therefore, with the two signal heads 18 and 19 in line, the pulses in one track are generated alternately with the pulses in the other track. The two groups of impulses are sensed by the two magnetic heads 18 and 19 and the resulting signals are amplified by amplifiers 20 and 21. They may be fed by gates 22 and 23 respectively to the counting stage 24. The number of pulses entered from each of the pulse groups $16^{1-n}$ and $17^{1-n}$ into the counting stage 24 depends on the respective lengths of the high frequency recordings, 12 and 13 in the respective sub-sectors $8^{1-n}$ of the two storage tracks 3 and 2.

These recordings in the storage tracks 2 and 3 are sensed by two signal heads 25 and 26 and the resulting signals are amplified by the two amplifiers 27 and 28. From there the signals are fed to the two control stages 29 and 30. The two gates 22 and 23 are controlled by these two control stages 29 and 30, such that pulses which are sensed from the two signal tracks 5 and 6 cannot pass through the gates 22 and 23 while a low-frequency recording is being sensed from the two storage tracks 2 and 3 respectively by the signal heads 25 and 26. When the high-frequency recordings 12 and 13 are sensed by the signal heads 25 and 26, the control stages 29 and 30 alter their state and make the two gates 22 and 23 operative.

Thus pulses which are sensed by the two signal heads 18 and 19 from the two signal tracks 5 and 6 are now fed to the counting stage 24. The operation of the two control stages 29 and 30 is dependent on whether they receive low-frequency recordings 14 and 11, or not. The frequency of these oscillations is such that approximately 5 to 6 cycles are recorded in a distance equal to the separation between adjacent recorded pulses on the signal tracks 5 or 6. This relationship of frequencies has been chosen in order to avoid by integration spurious impulses or noise. The control stages 29 and 30 are designed in such a way that upon the non-arrival of more than three cycles of the recordings 14 and 11, these control stages switch back into their initial state and thereby the two gates 22 and 23 are rendered operative. The amplifiers 27, 28 are so arranged that they amplify only the low-frequency recordings 14 and 11, whereas the high-frequency recordings 12 and 13 are above the cut-off frequency of the two amplifiers 27 and 28 and are not amplified. Thus, these high-frequency recordings have no influence on the control stages 29 and 30.

Within each sub-sector $8^{1-n}$ a number of pulses are sensed and fed to the counting stage 24, the sum of which corresponds to the sum of the two digit values, which are recorded in the storage tracks 2 and 3, and a pulse is delivered from that counting stage when the sum of the two sets of pulses is higher than "9." Such "tens-carry" pulse is fed through lead 31 to the carry storage stage 32.

The carry storage stage 32 includes a flip flop, which is switched from one stable state to the other by a pulse fed to it through lead 31. Hereby this pulse will be stored by the setting of the counting stage 32 until the storage stage 24 has been prepared for the computation of the next denomination, that is until after the recording in one of the storage tracks 2 or 3 of the stored result from counting stage 24. After this recording a pulse is applied to storage stage 32 through lead 33, which switches back the flip flop of storage stage 32 to its initial state if it has previously been switched by a carry pulse, whereby a pulse is generated which is fed through lead 34 to the counting stage 24 to preset it to register "1."

The pulse on the lead 33 occurs when one of the permanently recorded pulses $35^{1-n}$ recorded in signal track 4 at the end of each of the sub-sectors $9^{1-n}$ is sensed by signal head 36 and amplified in amplifier 37. From the amplifier 37 the pulse is fed through lead 33 to the storage stage 32.

Figure 2:
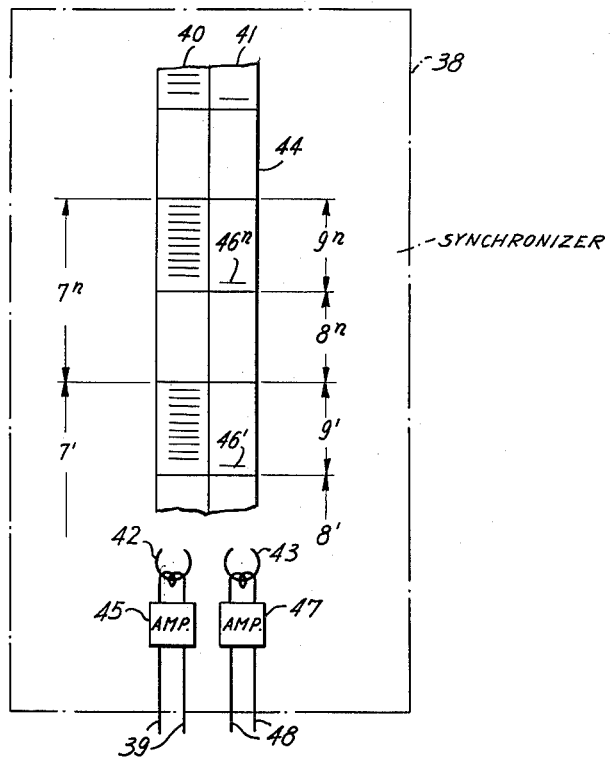
FIGS. 2–10 are detailed diagrams of switching units shown as blocks in FIG. 1.

Before this pulse is applied to lead 33, the counting stage 24 must be reset to the zero position. This is effected by pulses fed from synchronizing stage 38, through leads 39 to the counting stage 24. The synchronizing stage 38, which is shown in more detail in FIG. 2, includes two signal generators, which are formed by the two signal tracks 40 and 41 sensed by the two signal heads 42 and 43. The signal tracks 40 and 41 are also on the drum 1, or they may be on a further drum which is coupled directly to the rotating drum 1, or is synchronized with it. The signal tracks 40 and 41 are also subdivided into separate sectors $7^{1-n}$ and these again are subdivided into separate sub-sectors $8^{1-n}$ and $9^{1-n}$. This subdivision corresponds to that of the tracks 2–6 of the rotating drum 1.

On the signal track 40 and within each of the sub-sectors $9^{1-n}$ are pulse groups, each with "10" pulses. These pulses may be recorded, as already described with reference to the signal tracks 5 and 6, on a magnetizable layer or by permanent magnets held in slots in a non-magnetic part of the drum. When a sub-sector $9^{1-n}$ is sensed by signal head 42 "10" pulses are sensed and these are amplified by amplifier 45. The amplified pulses are fed through leads 39 to counting stage 24 and increase the registered value by unity for each pulse.

At the beginning of each of the subsectors $9^{1-n}$, there is recorded in signal track 41 a permanent signal $46^{1-n}$, which is sensed by signal head 43 and amplified by amplifier 47. The amplified pulses are fed through leads 48 to the control stage 49 whereby this is switched over, so that low-frequency signals, which are generated by generator 50 and fed through lead 51, to the input of the control stage 49, may pass via leads 51 to the signal head 52. The signal head 52 is positioned on the circumference of drum 1 at such a way that when signal head 26 is in the beginning of one of the sub-sectors $9^{1-n}$ of storage track 2, the head 52 is at the beginning of the preceding sub-sector $8^{1-n}$ of the same storage track. As the signal head 43 is mounted on the same axial line as signal head 26, this means that the control stage 49 is switched over just at the time instant when the signal head 52 is at the commencement of the corresponding sub-sector $8^{1-n}$.

The recording of the low-frequency signal by signal head 52 is effective until the control stage 49 is switched back to its initial state. This occurs when the counting stage reaches the full counting capacity "10" and generates a lead on lead 53 which switches over control stage 49 so that signals from signal generator 50 are not transferred, whereas the other control stage 54 is switched over in such a way, that the high-frequency generated by generator 55 is now fed through lead 56 to the signal head 52 and will be recorded on the remaining part of the particular sub-sector $8^{1-n}$.

The length of this high-frequency recording, which is effective to erase any previous recording, represents the result of the preceding addition. This is so because after counting stage 24 has been advanced during the passage of the particular sub-sector $8^{1-n}$ past the sensing heads 25 and 26 to the registration representing the sum of the two digit values, which have been recorded in the storage tracks 2 and 3, less any carry, 10 pulses are delivered from signal generator 38 through leads 39 to counting stage 24. These 10 pulses advance the counting stage 24, beginning from the result of the preceding addition, to the full counting capacity 10. On reaching this counting capacity, the pulse mentioned above occurs on lead 53 and causes the change in the frequency of the signals applied to signal head 52.

The termination of the high frequency recording at the end of the particular sub-sector $8^{1-n}$ is effected by the corresponding one of the pulses $35^{1-n}$ which is recorded in signal track 4. As the end of the particular sub-sector $8^{1-n}$ passes the signal head 52, the end of the corresponding sub-sector $9^{1-n}$ passes signal head 36. The corresponding one of the pulses $35^{1-n}$ will be sensed at the end of the sub-sector $9^{1-n}$ to provide a signal amplifier 37. From there this pulse is fed through lead 33 to the storage stage 32. If the stage was registering a carry it produces a pulse, which is fed through lead 34 to the counting stage 24 which is in zero position.

The pulse from amplifier 37 is also fed through leads 57 to control stage 54, and switches this into the other state, so that the high-frequency signals generated by generator 55 are blocked and no further recording or erasing takes place.

The operation just described takes place during the passage of each of the sectors $7^{1-n}$, so that, denomination by denomination, two numbers will be added as each of the sectors $7^{1-n}$ corresponds to a denomination of a number. Hereby it is possible to compute with an arithmetic unit having only one denomination, any number of denominations as the maximum capacity of the counting device is dependent only on the number of sectors $7^{1-n}$ of the circumference of drum 1.

Referring now to FIGS. 3-10 the various electronic units of FIG. 1 are described in more detail.

Figure 3:
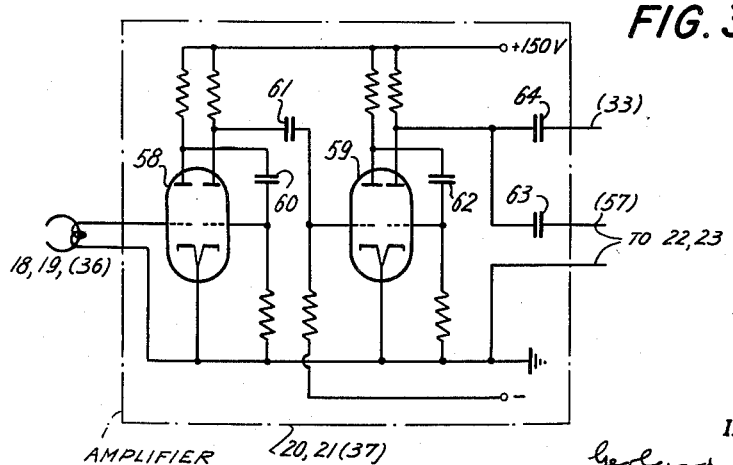
Figure 4:
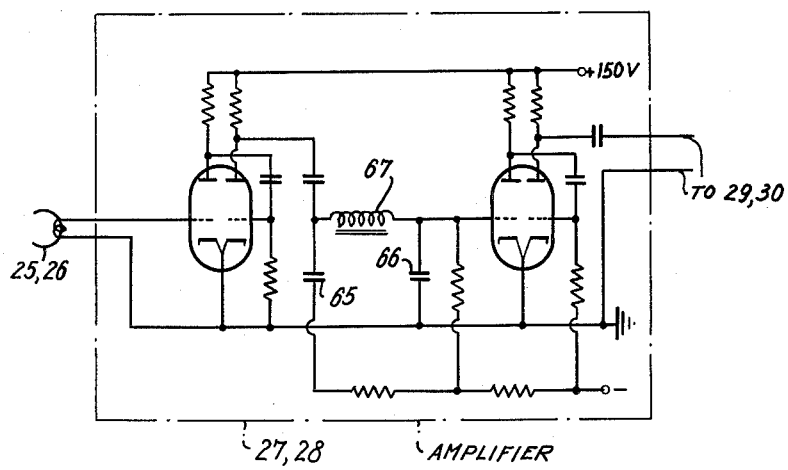

FIG. 3 shows the circuit diagram of the two amplifiers 20 and 21 which are identical. They are normal low-frequency amplifiers which include the two double triodes 58 and 59 as amplifying elements. Signals which are sensed by the signal heads 18 or 19 are applied to the control grid of the left-hand system of the double triode 58, and are amplified by this triode. Through capacitor 60 the amplified signals are fed to the right-hand system of the double triode 58 and are there further amplified. From the anode of the right-hand system of the double triode 58 the signals pass through capacitor 61 to the left-hand grid of the second double triode 59 and from the left-hand anode of this tube through capacitor 62 to the right hand grid, so that they are amplified in the right-hand system of this double triode 59 a second time.

From the right-hand anode the signals pass through capacitor 63 to the output lead 57 and from there to the two control stages 22 or 23. The amplifier 37 has basically the same structure, but in this amplifier the signals from the right-hand anode of the double triode 58 are also fed through capacitor 64 to lead 33 and from there to storage stage 32.

The two amplifiers 27 and 28 (FIGURE 4) differ from those above described only in that, the amplification is reduced at high frequency. Only the low frequency recording will be amplified, between the right-hand anode of the first double triode and the left-hand grid of the second double triode. A filter formed by the two capacitors 65 and 66 and the inductance 67 between the right hand anode of the first triode and the left hand grid of the second triode. The cut-off frequency of the filter 65, 66, 67 is such that this frequency is higher than the low frequency generated by generator 50, but below that generated by generator 55. Consequently, the two forms of recordings are sensed by the signal heads 25 and 26, but only the low frequency signals are fed to the output leads, which are connected to the control stages 29 and 30. The grid bias of the right-hand system of the double triode of these amplifiers 27 and 28 is such that only the positive half waves of the sinusoidal recordings 14 and 11 will be fed to the output leads.

Figure 5:
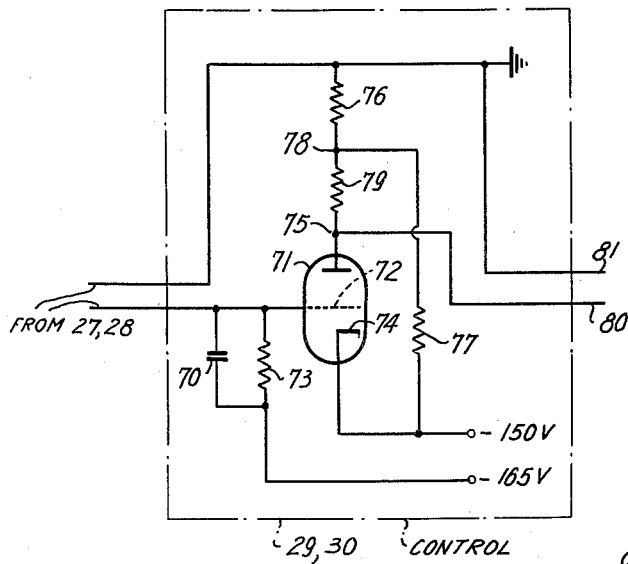

FIG. 5 shows the circuit diagram of one of the control stages 29 and 30. The positive half waves of the recordings 14 and 11, are fed to this control stage through the input lead and they charge the capacitor 70 connected to the grid of the triode 71 to a determined potential. The grid 72 of the double triode 71 is biassed negatively through resistor 73 so that the anode current is normally almost zero. The voltage at point 75 is nearly equal to that at point 78 of the voltage divider formed of the two resistors 76 and 77, since there is only a very small voltage drop across anode resistor 79.

If on the other hand, positive signals are applied to the input lead, the capacitor 70 is charged to a positive potential, whereby the voltage at grid 72 is increased so that a greater anode current will flow. This anode current produces an increased voltage drop across anode resistor 79, so that lead point 75 becomes considerably negative with respect to ground. This negative bias is fed via lead 80 to the respective one of the gates 22 and 23.

The gates 22 and 23 are normally operative, that is, when no positive signals are fed to the corresponding control stage 29 or 30. Pulses, which are fed from the respective one of the amplifiers 20 or 21 to the input of these gates may therefore pass. If the corresponding control stage 29 or 30 is driven, there arises at lead 80 the already-mentioned negative voltage and the respective one of the gates 22 and 23 will be made inoperative and will not pass the pulses. Lead 81 is the connection of ground potential to the two stages.

Figure 6:
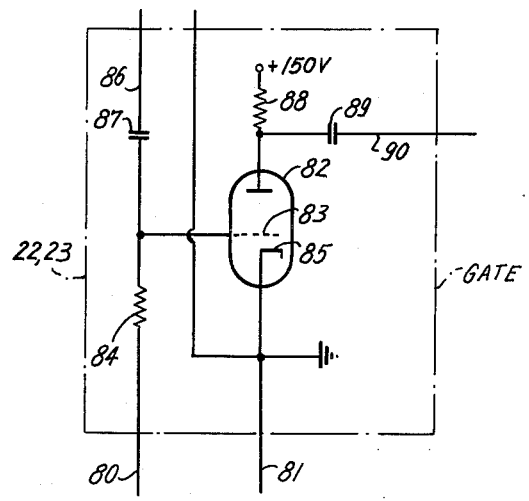

FIG. 6 shows a circuit diagram of one of the gates 22 or 23. It includes a triode 82, the grid 83 of which is connected through grid resistor 84 to lead 80. Cathode 85 is connected to ground potential and is connected through lead 81 with the corresponding control stage 29 or 30. If this coordinated control stage is not driven, then only such a negative bias is delivered to the grid 83 of the triode 82 as is generated by the voltage divider formed of the two resistors 76 and 77.

The negative bias is such that the triode 82 is only biassed just below the cut-off potential, so that positive pulses which are applied from input lead 86 through capacitor 87 to the grid 83, can alter the grid from cut-off to zero, and are therefore amplified in the triode 82, and produce negative pulses across anode resistor 88, which are fed through capacitor 89 to the output lead 90.

If the coordinated control stage 29 or 30 is driven, a considerable negative potential appears on control lead 80, so that the grid 83 also has a strongly negative bias. This negative bias is such that positive pulses which are fed to the grid 83, are not able to bring the grid 83 above the cut-off voltage, so that no anode current alterations occur. As the control stages 29 and 30 allow the gates to be operative as long as a low frequency recording is not being sensed, pulses are produced at the outputs of the gates during the sensing of high frequency recordings by the associated heads. No pulses are recorded in the sub-sectors 9 of the tracks 5 and 6 so that there is no output from the gates during the sensing of these sub-sectors, even though there is no low frequency recording in such sub-sectors of the tracks 2 and 3.

Figure 7:
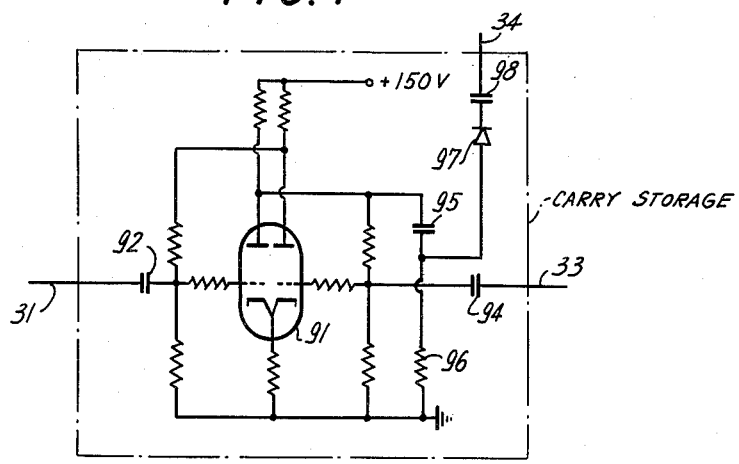

FIG. 7 shows the circuit diagram of the carry storage stage 32. The storage stage 32 is formed by a flip flop which includes a double triode 91. In the arrangement illustrated, which may be presumed as known, the double triode 91 has two stable conditions, i.e. it can have either a conductive left-hand or a conductive right-hand system. The initial state is such that the right-hand system of the double triode 91 is conductive. If a positive pulse is fed to storage stage 32 from lead 31 through capacitor 92 to the grid of the left-hand system of the double triode 91, then the flip flop is switched over in such a way that the left-hand system of double triode 91 is then conductive and a negative voltage drop occurs at left-hand anode. The pulse on lead 31 occurs, when the counting stage 24 reaches its maximum counting capacity after the counting of the pulses from the gates 22 and 23, i.e. the pulse at lead 31 is a carry pulse.

At the end of the counting period, during which one denomination of each of the two numbers which are to be added is processed, there occurs in lead 33 a positive pulse, which is generated by the sensing of one of the signals $35^{1-n}$. This positive pulse is fed through capacitor 94 to the grid of the right hand system of the double triode 91 and switches this back into its initial state. This produces a positive voltage rise at the left hand anode which will be differentiated by capacitor 95 and resistor 96. With the previously mentioned negative voltage drop such a differentiation takes place and a negative pulse results, which is blocked by diode 97. However, when a positive voltage rise occurs, the differentiation results in a positive pulse, which may pass the diode 97 and is fed through capacitor 98 to the output lead 34. From there this positive pulse enters counting stage 24 and advances it by "1" to enter the carry for the next denomination which is to be processed.

Figure 8:
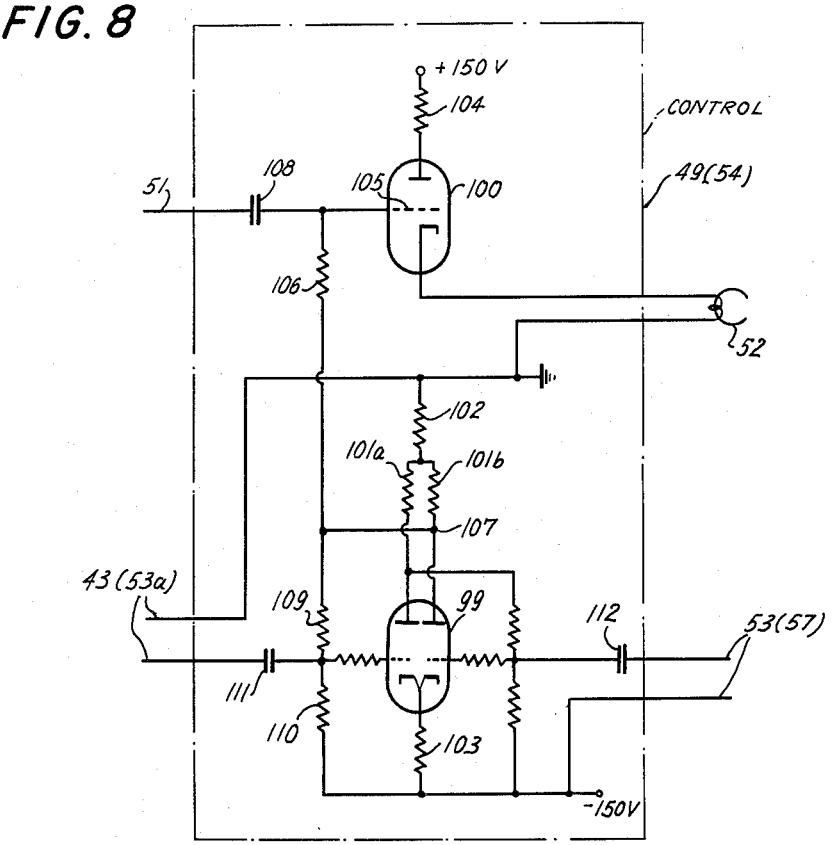

FIG. 8 shows a circuit diagram of one of the control stages 49 and 54. These are made up of a flip flop, which controls a triode gate. This flip flop includes a double triode 99 and the gate is comprised by the triode 100. The switching and operation of the flip flop may be presumed as known.

The anodes of the double triode 99 are connected through the two anode resistors 101$^a$ and 101$^b$ and the common resistor 102 to ground potential, whereas the cathode of double triode 99 is connected through cathode resistor 103 to —150 volts. The cathode of triode 100 is connected through signal head 52 to ground potential whereas the anode of this triode is connected through anode resistor 104 to a potential of +150 volts. The grid 105 of triode 100 is connected through grid resistor 106 with lead point 107, i.e. with the anode of the right hand system of double triode 99.

As the initial position of the flip-flop, it may be assumed that the right hand system of the double triode 99 is conductive. Consequently, lead point 107 has a negative voltage which is caused by the voltage drop across the common resistor 102 and by the additional voltage drop across resistor 101$^b$ in consequence of the anode current through the right hand system of the double triode 99. This considerably negative voltage is led through grid resistor 106 to grid 105 whereby signals which enter the input lead 51 and are fed through capacitor 108 to the grid 105 cannot bring this grid higher than the cut-off voltage of the triode 100 so that the tube 100 is non-conducting. If on the other hand the flip-flop is switched over, so that the left-hand system of the double triode 99 becomes conductive and the right hand system is non-conductive, then there is a negative voltage at lead point 107 which is generated by the voltage drop across the common resistor 102 and the anode resistor 101$^b$ due to the current of the voltage divider formed by the two resistors 109 and 110. The potential of lead point 107 is such, that the tube 100 will be conducting, and signals which arrive from input lead 51 through capacitor 108 to grid 105 will produce corresponding anode current alteration in the tube 100.

The anode current flows through the winding of the signal head 52. By an alteration of this current, there is therefore effected a recording of signals arriving at lead 51 and the recording takes place on the surface of that storage area within a track which is opposite to the signal head during that particular time.

The flip-flop is switched on by pulses which are fed from the input leads 43 through capacitor 111 to the left hand grid of double triode 99. By these positive pulses the left hand system of double triode 99 is made conductive, whereas the right hand system becomes non-conductive. Consequently, the voltage at lead point 107 increases and the tube 100 can be controlled by signals on lead 51. If a positive pulse is delivered to the lead 53, this pulse reaches the right hand grid of the double triode 99 through capacitor 112 and switches the flip flop over, so that the right hand system of this double triode 99 becomes conductive. Hereby lead point 107 becomes considerably negative and the pulses on lead 51 cannot effect anode current alterations in tube 100 and the anode current of this tube remains practically zero.

Figure 9:
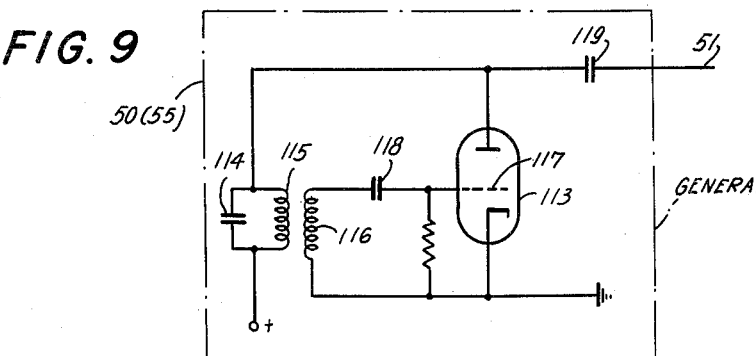

FIG. 9 shows one of the generators 50 and 55, which are controlled by the corresponding control stages 49 and 54. These generators are normal oscillators, which include the triode 113 the anode circuit of which is tuned by capacitor 114 and the inductance 115. The winding 116 is coupled to the inductance 115 and also to the grid of triode 113, to provide sufficient feedback to make the oscillator self-maintaining. The circuit constants are so chosen that the generators 50 and 55 provide the required low and high frequencies respectively. The output is taken via coupling capacitor 119.

Figure 10:
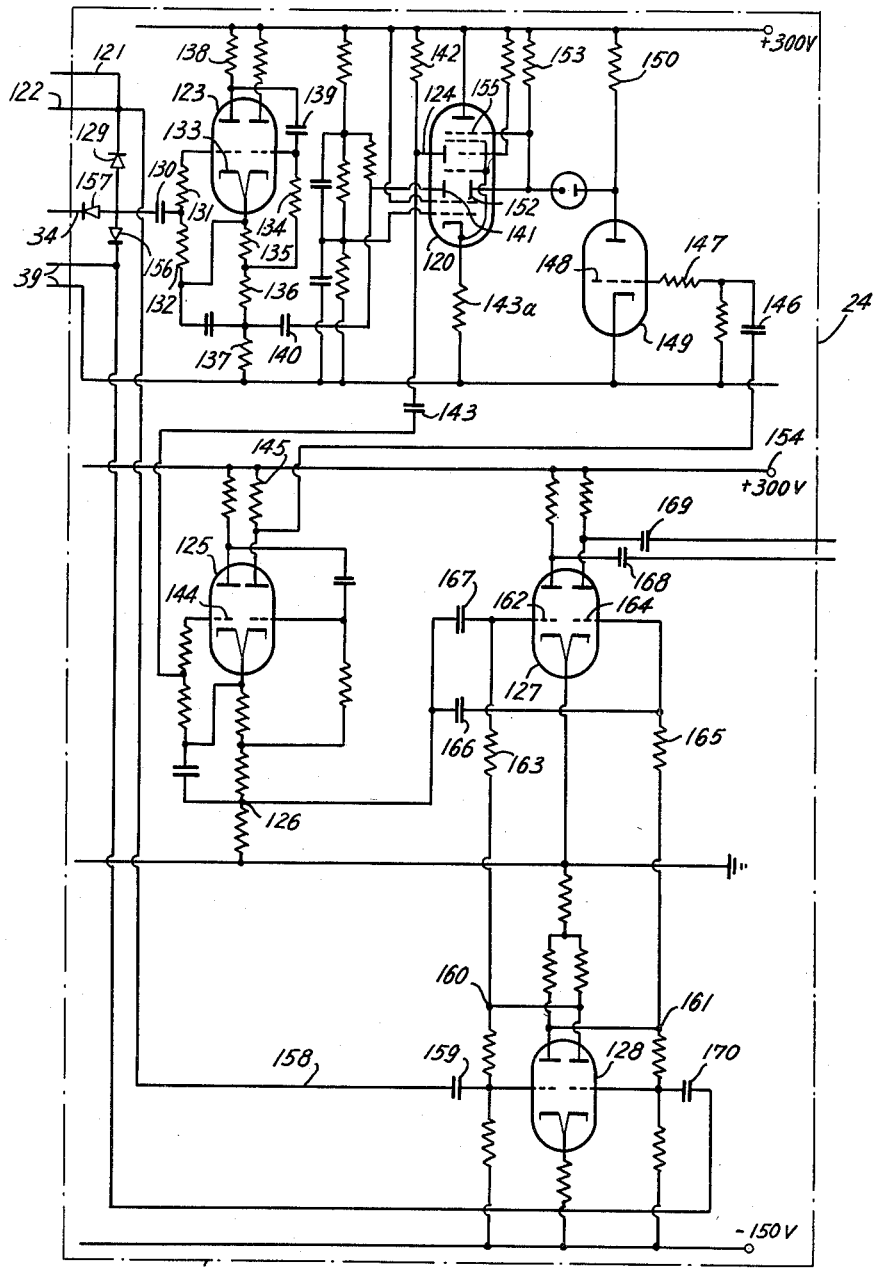

FIG. 10 shows a circuit diagram of counting stage 24 in more detail. This counting stage 24 includes the ten-stage counting tube 120, which may be advanced from each counting position to the next by pulses. These pulses on the leads 34, 121, 122, and 39 are re-shaped by a pulse re-shaping stage. This pulse-reshaping stage includes a double triode 123. If the counting capacity "10" of the counting stage 120 is reached, a negative pulse occurs at the auxiliary anode 124, which effects switching of the monostable flip flop, which includes the double triode 125.

At lead point 126 of the monostable flip flop a positive pulse is generated on switching, which is amplified by one or other half of the double triode 127 and applied either to lead 31 or to lead 53. The control stage which is formed by the double triode 127 is controlled by the flip flop with the double triode 128.

Negative pulses are fed through the input leads 121 and 122 fed to the counting stage from the two gating stages 22 and 23. These negative pulses reach the left-hand grid of the double triode 123 through diode 129, capacitor 130 and resistor 131. This grid is connected through the resistors 131 and 132 with cathode 133 so that the grid bias is zero volts. The right hand grid of the double triode 123 is connected through its grid resistor 134 to the connection point of the resistor 135 with the resistor 136. The resistors 135 and 136 form, together with resistor 137, a voltage divider for the cathode voltage of the double triode 123. The right hand grid of double triode 123 receives practically cut-off bias through resistor 134.

The negative pulses which are fed to the left hand grid of the double triode 123, cause a reduction in the anode current of the left hand system so that the voltage drop across resistor 138 is momentarily diminished. This positive voltage pulse is fed through a capacitor 139 to the right hand grid of double triode 123 and increases the grid bias of this system. The resulting increase of anode current lasts until the charge of the capacitor 139 has been adapted to the new voltage conditions and until a negative bias is applied to the right hand grid by the voltage drop across cathode resistor 135 through grid resistor 134, so that the right hand system again becomes non-conducting and the left hand system becomes conductive.

Simultaneously with the increase of the anode current in the right hand system of the double triode 123, an increase of the cathode current occurs, which results in a positive voltage pulse across resistor 137. This positive voltage pulse will be fed through capacitor 140 to the left hand deflection electrode 141 of the counting tube 120. The counting tube 120 is a commercially obtainable tube of the type E1$t$, the operation of which may be assumed as known.

Each of the positive pulses to the deflection electrode 141 causes, the electron beam from the cathode of the counting tube 120 to be deflected by a further step to a new stable condition. After the tenth step of deflection, the electron beam hits the auxiliary anode 124, so that an anode current flows from the plus pole through anode resistor 142, the auxiliary anode 124, the anode-cathode path and through the cathode resistor 143$a$. This current produces a voltage drop across anode resistor 142 which is fed as a negative pulse through capacitor 143 to the left hand grid 144 of double triode 125. This indicates that the full capacity of the counting tube 120 has been reached and that now a pulse must be delivered to this counting tube to switch the electron beam back into its initial position.

The pulse delivered through the capacitor 143 may furthermore be used for other control purposes. The switching back of the electron beam in the counting tube is effected by the monostable flip flop formed by double triode 125 which corresponds in its operation to the double triode 123, and the switching back of the beam takes place in dependence on switching of the monostable flip flop as a result of a negative pulse conducted through the capacitor 143 to the left-hand grid 144 and effecting a momentary anode current through anode resistor 145 and a momentary increase of the cathode current.

The current flowing through anode resistor 145 produces a negative pulse which is fed through capacitor 146 to the grid 148 of triode 149. The negative pulse momentarily cuts off the triode 149 and the voltage drop across anode resistor 150 disappears. The voltage of the anode of diode 151 rises and carries the cathode with it. This cathode is connected to the right deflection electrode 152. This rise in potential of the electrode 152 returns the electron beam in a relatively short time into its initial position, i.e. the counting tube 120 is reset to zero.

As the anode current interruption of tube 149 takes place momentarily, only, the voltage drop through anode resistor 150 quickly returns the anode of diode 151 to a potential which is lower than the standing potential at the deflection electrode 152. This cuts off the diode and renders it ineffective during normal counting.

Pulses to be counted are also fed to the triode 123 from the circuit 38 via leads 39 and diode 156, and from the carry storage stage 32 via lead 34 and diode 157. These pulses operate the counting stage in a manner similar to that already described. Negative pulses occur on the leads 121 and 122 during the first phase of each denomination-wise addition. These pulses are fed through lead 158 and capacitor 159 to the left hand grid of the double triode 128 to cut off the left hand system of this double triode. The triode is connected as a bi-stable flip-flop, so that the first such pulse switches it from the initial state. The potentials at points 160 and 161 of the flip-flop control operation of the two halves of the double triode 127. This is effected by a connection of grid 162 with lead point 160 through grid resistor 163, and by a connection with lead point 161 of grid 164 through grid resistor 165. In the initial position of the flip flop 128 there is a large negative bias at lead point 161, so that positive pulses applied to the grid 164 through capacitor 161, cannot increase the grid bias of this grid to the cut-off voltage so that the anode current of the right hand system of the double triode 127 remains blocked. On the other hand, there is at lead point 160 a negative voltage only just below the cut-off voltage. Positive pulses which are applied through capacitor 167 to this grid 162 may therefore change the grid bias between the cut-off voltage and zero, so that these pulses produce negative pulses at the anode of the left hand system of the double triode 127.

These negative pulses at the left-hand anode of the double triode 127, are fed through capacitor 168 to the output lead 53. If on the other hand the flip flop is switched from its initial state into the other state, the voltage at lead point 160 becomes highly negative, whereas the voltage at lead point 161 is less negative, positive pulses fed through capacitor 166 to grid 164 may now increase the anode current of the right-hand system of the double triode 127. The resulting negative pulses at the right hand anode are fed through capacitor 169 to lead 31.

During the first phase of each denominational addition, i.e. during the passing of the sub-sectors $8^{1-n}$ in past the signal heads 18 and 19, the flip-flop 128 allows pulses at grid 164 to be amplified and fed to lead 31. The carry storage stage 32 therefore receives a pulse if during this time the counting capacity of counting stage 120 is reached. During the second phase, negative pulses are fed to counting stage 24 at lead 39, and these advance the counting tube 120 from the digit value to which it had been adjusted as a result of the preceding addition, to the full counting capacity.

After this counting capacity has been reached, a negative pulse occurs again at auxiliary anode 124 which operates the monostable flip flop formed by the double triode 125, and switches the counting tube 120 back into its initial position in the manner described above. Simultaneously, the positive pulse generated by the switching of the monostable flip flop at lead point 126 is fed through the two capacitors 166 and 167 to the two grids 162 and 164.

The first pulse delivered to lead 39, which is fed through capacitor 170 to the right hand grid of double triode 128, returns this flip flop to its initial state so that now the left hand system amplifies pulses and delivers them through capacitor 168 to the lead 53. Hereby it is possible to transfer the positive pulse occurring at lead point 126 during the second phase (i.e. while the sub-sectors $9^{1-n}$ pass through the signal heads 18 and 19) to lead 53, where it may be used for further control purposes, e.g. it is used to switch over the two control stages 49 and 54, as described above.

Another embodiment of the invention will now be described which allows operation for both additions and subtractions.

Figure 11:
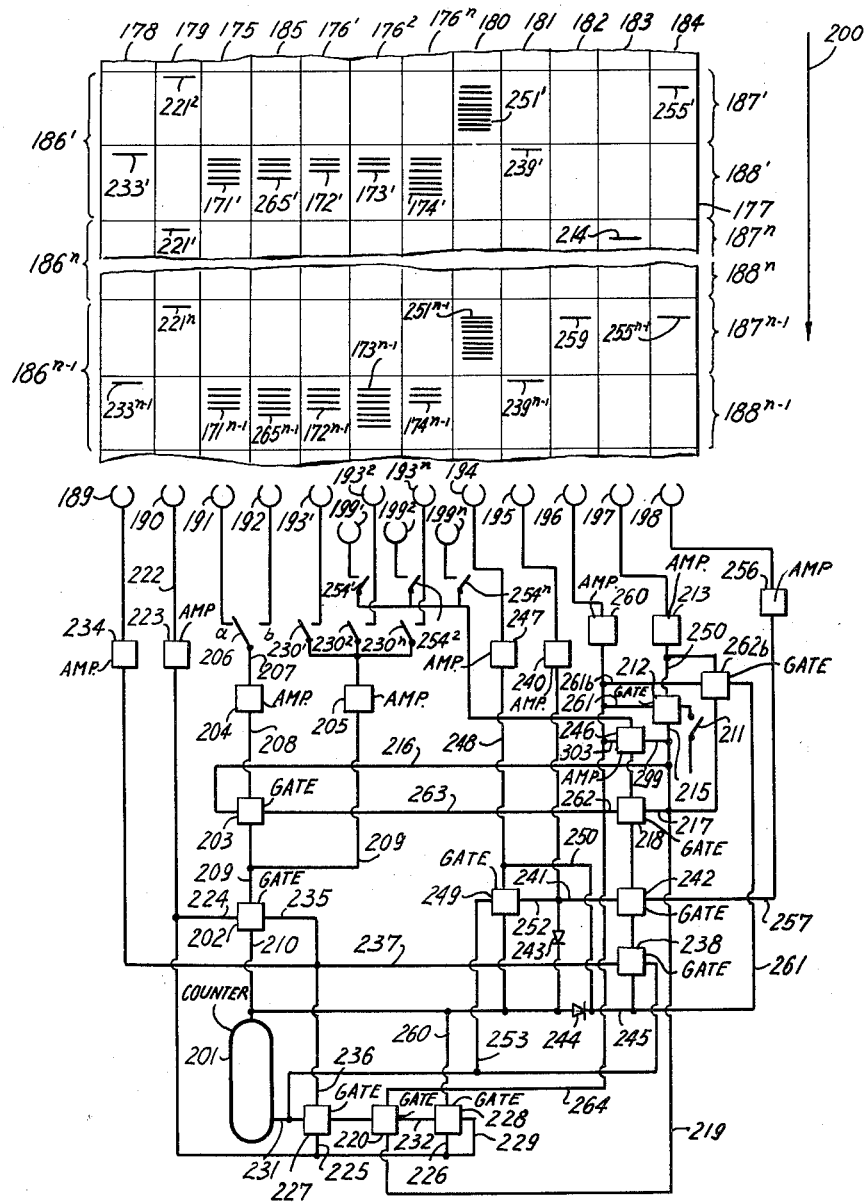
FIG. 11 is a schematic circuit diagram of an addition and subtraction device.

This other embodiment is described with reference to the block diagram of FIG. 11. The extra circuitry shown in FIG. 11 in comparison with the block diagram of FIG. 1 includes the corresponding subtraction device which is not shown in FIG. 1.

In this example, the representation of the single digit values which are to be processed is not effected by record of a frequency in defined lengths but by a corresponding number of individual recorded pulses, such as the pulses $172^1$ etc.

This means that the storage track 2 and signal track 5 as well as storage track 3 and signal track 6 of FIG. 1, have been replaced each by one signal track 175 and $176^{1-n}$. The signal tracks 175 and $176^{1-n}$ are on the surface of a rotatable storage drum 177. The storage drum 177 corresponds to the drum 1 in FIG. 1, but other storage means known in the art may be used with the same effect. The drum 177 is subdivided into signal tracks 175, $176^{1-n}$ and 178—185. The tracks 178—184 are used for synchronization and control purposes, whereas the storage tracks $176^{1-n}$ are used for recording the result of a computation, for example the sum of an adding process.

On the storage track 175 the second summand for an addition is recorded, whereas on storage track 185 a value complementary to that in the storage track 175 will be stored. This is the complementary digit value as a complement to "9" which is required for subtraction purposes. In the embodiment of FIG. 11, the circumference of the rotatable drum 177 is sub-divided into separate sectors $186^{1-n}$. Each of these sectors $186^{1-n}$ is again sub-dividded into two sub-sectors $187^{1-n}$ and $188^{1-n}$. During the movement of the sub-sectors $188^{1-n}$ past the respective signal heads there takes place the addition or subtraction of a denomination of the number, whereas during the movement of the sub-sectors $187^{1-n}$ past the respective signal heads the result of the preceding computation will be recorded.

The recording of the result is effected by the signal heads $199^{1-n}$ which are displaced relatively to the corresponding sensing heads $191^{1-9}$ by a distance of one sub-sector in the direction of rotation 200. The results will therefore be recorded in the sub-sector areas $188^{1-n}$ but during a time when the sub-sectors $187^{1-n}$ are passing the signal heads 189–198. A one-denomination counting stage 201 is used by which the single digit values of the denominations of a number are successively added or subtracted.

The counting stage 201 will be advanced by pulses, which are controlled by the gates 202 and 203 and are amplified by the amplifiers 204 and 205. The pulses for amplifier 204, during additions are sensed by signal head 191 from storage track 175. These pulses, sensed by signal head 191, reach the input lead 207 of the amplifier 204 through switching position of the contact 206 and are fed through lead 208 to the gate 203.

From the gate 203, these pulses are fed through lead 209 to the input of the gate 202. Pulses sensed by one of the signal heads $193^{1-n}$ and amplified by amplifier 205 are also fed to gate 202. The pulses which enter through the gate 203 and the gate 202 represent one operand which is to be added whereas the pulses which enter lead 209 through the amplifier 206 represent the second operand, which may be an already-obtained result to which further numbers are to be added.

If a number has to be subtracted from another, switch 206 will be switched over into contact position $b$ so that pulses which are sensed from storage track 185 by signal head 192 enter the gate 202 through amplifier 204 and the gate 203. These pulses, which are recorded on signal track 185, represent the digit values as complements to "9" of the digit values recorded on track 175.

The record on the two storage tracks 175 and 185 is effected by a known input device not shown. The above-mentioned pulses enter the counting stage 201 through the gate 202 and lead 210. The control of the input of these pulses into the counting stage 201 is effected in the following way. Due to the closing of the contact 211 by a control device or a similar device, the gate 212 will be made conductive, so that a pulse which is sensed by signal head 197 from signal track 183 and amplified by amplifier 213 may pass said gate.

Only one pulse 214 is recorded on track 183 at the end of the sub-sector $187^n$ of the last sector $186^n$. The pulse 214 indicates the beginning of a cycle of rotation of the drum. It is sensed as described above by signal head 197 and enters the gate 212 through lead 250. The pulse is then fed through lead 216 to the gate 203, through lead 217 to the gate 218 and through lead 219 to the gate 220. These three gates are made operative by this pulse.

Immediately following this, pulse $221^1$ is sensed by signal head 190 from signal track 179. At the end of each sector $186^{1-n}$ of the signal track 179 one of the pulses $221^1$ to $221^n$ is recorded. Pulse $221^1$ is recorded at the end of sector $186^n$ and pulse $221^2$ is recorded at the end of sector $186^1$. The first sensed pulse $221^1$ is fed through lead 222 to the input of amplifier 223. After this pulse has been amplified in the amplifier 223, it is fed through lead 224 to the gate 202, whereby said gate is made operative. Furthermore, this pulse arrives at the two gates 227 and 228 through the leads 225 and 226. The gate 227 is also made operative by this pulse, whereas the pulse delivered through lead 226 has no effect on the gate 228, since the initial position of the gate 228 is such that pulses are blocked. For the same reason, the pulse on lead 229 of the controllable gate 228 remains without effect.

When the two gates 202 and 203 are operative or closed pulses which are sensed by signal head 191 may, through amplifier 204 and the two gates 202 and 203, enter the counting stage 201. Simultaneously, pulses which are sensed by one of the signal heads $193^{1-n}$ enter the counting stage 201 through amplifier 205 and the gate 202. This is possible since one of the contacts $230^{1-n}$ has previously been closed by a control device before or on the closing of contact 211. Therefore, there is a connection between one of the signal heads $193^{1-n}$ and the input of the amplifier 205.

The pulses from signal head 191 and from one of the signal heads $193^{1-n}$ reach the lead 210 with a time shift between them, so that each time only one pulse appears from the particular one of the signal heads $193^{1-n}$ in each gap between two pulses from signal head 191. This may be achieved in different ways, either by the signal heads 191 and 192 being shifted in relation to the signal heads $193^{1-n}$ by a distance equal to half the pulse spacing or by the recordings on the storage tracks 175 and 185 being made in such a way that the pulses in those tracks are shifted by half a pulse distance relatively to the recordings on the storage tracks $176^{1-n}$ or, furthermore as a preferred embodiment, by there being either in the transfer circuit from one of the signal heads $193^{1-n}$ to the gate 202 or in the circuit from signal head 192 to the gate 202, a delay stage providing a delay of half the time between adjacent pulses.

As the sum of pulses which are sensed by signal head 191 and one of the signal heads $193^{1-n}$ corresponds to the sum of the last denomination of the two numbers which are to be added, counting stage 201 will be set to this sum. If the digit value of this partial result is greater than "9," then a pulse occurs on lead 231 which, through the two gates 227 and 220, reaches the control lead 232 of the gate 228. The gate 228 is made operative and a pulse on lead 226 may pass through said gate.

At the end of the sub-sector $186^1$, the pulse $233^1$ recorded on storage track 178 will be sensed by signal head 189. The pulse $233^1$ is amplified by amplifier 234 and reaches the gate 202 through lead 235, and opens or blocks this gate so that no further pulses may enter the counting stage 201 from amplifiers 204 and 205. Furthermore, the pulse amplifiers by amplifier 234 is fed through lead 236 to the gate 227 and through lead 237 to the gate 238. These two gates also are made inoperative so that no further pulses may pass.

At the end of each of the sub-sectors $188^1$—$188^{n-1}$, the pulses $239^1$—$239^{n-1}$ are recorded on signal track 181. These pulses are a little delayed behind the pulses $233^1$ to $233^{n-1}$ whereby after the functions described above have been effected by pulse $233^1$, the pulse $239^1$ is sensed by a signal head 195. The pulse $239^1$ is amplified by amplifier 240 and reaches through lead 241 the gate 242. The gate 242 is thus closed or made operative.

Furthermore, the pulse amplified by amplifier 240 is fed through the diode 243 to the input of counting stage 201 whereby said counting stage is advanced by one counting position and said pulse simultaneously reaches the input of the gate 238 through diode 244 and lead 245. Since the gate 238 has been made inoperative or opened by pulse $233^1$, the pulse delivered to lead 245 cannot pass said gate.

The gates 238, 242 and 218 represent the transfer circuit for pulses, which are amplified by amplifier 246 and are to be recorded by one of the signal heads $199^{1-n}$. With gate 242 and gate 238 operative, it is possible to conduct pulses through these three gates to the amplifier 246, as the gate 218 has already been made operative by the pulse 214.

The gate 238 will be made operative by a pulse in the lead 231 at the counting stage 201. This pulse is produced when counting stage 201 is advanced to the full counting capacity "10." This is effected by pulses which are sensed by signal head 194 and amplified by amplifier 247. These pulses reach the input lead 210 of counting tube 201 through lead 248 and gate 249. Simultaneously these pulses are conducted through lead 250 to the input of the gate 238.

Within each of the single sub-sectors $187^1$—$187^{n-1}$ on track 180, there are recorded pulse groups $251^1$—$251^{n-1}$, each group having "9" pulses. These pulses, when sensed, are conducted in the manner described above to the counting stage 201 and advance the counter to the zero position. These pulses are passed by gate 249 which is made operative by the pulse $239^1$ and allows the passing of pulses.

After the termination of the preceding computation, in which the lowest denomination of each of two numbers which are to be processed were added, the counting tube 201 now receives pulses until the full counting capacity is reached. At this time instant, there arises a pulse at lead 231, which is fed through lead 246 to the gate 238 and through lead 253 to the gate 249. The gate 249 is rendered inoperative so that the further pulses amplified by amplifier 247 are no longer fed to the counting stage 201 and said counting stage remains in the zero position.

The gate 238 on the other hand will be made operative by the pulse on lead 231, so that the pulses which exceed the counting capacity of counting tube 201 may now pass from amplifier 247 through lead 250 and the gate 238, and through the two gates 242 and 218 may reach the recording amplifier 246. The output of the amplifier 246 is connected through one of the contacts $254^{1-n}$ to one of the signal heads $199^{1-n}$. The closing of one of the contacts $254^{1-n}$ is effected by a control device together with a closing of one of the contacts $230^{1-n}$.

Those pulses which are sensed by signal head 194 and exceed the counting capacity of counting stage 201 are recorded by the corresponding signal head $199^{1-n}$ on the coordinated storage track $176^{1-n}$. The pulse $255^1$ from sub-sector $187^1$ of signal track 184 is sensed by signal head 198 and amplified by amplifier 256. Through lead 257, this pulse is fed to the gate 242 to render it inoperative. The pulse $255^1$ is a signal for the termination of the first partial addition process, during which the lowest denomination of each of two numbers which are to be added, had been processed.

The pulse $221^2$ follows pulse $255^1$ in direct succession. The pulse $221^2$ is sensed by signal head 190 and represents the signal for the start of the second partial addition of the next least significant denomination of the two numbers which are to be added. The pulse $221^2$ from the signal head 190 passes through amplifier 223 as described above to the gate 202 and then to the gates 227 and 228. If, during the preceding partial addition, a pulse occurred on output lead 231, which indicates that the value in counting stage 201 is higher than "10," this pulse reaches the gate 228 through the gates 227 and 220 which also is operative at this period, as well as through lead 232 whereby the gate 228 is made operative. The gate 228 allows the pulse $221^2$ amplified by amplifier 223, and entering the gate through lead 226 to pass to lead 260 and to the input of counting stage 201. The counting stage is thus advanced by one counting from its zero position, and a carry-over from the preceding partial addition takes place.

In the manner described above, denomination after denomination of the two numbers which are to be added will be processed. After almost a complete rotation of drum 177 the sector $186^{n-1}$ arrives at the sensing position. In this sector are recorded the highest denominations of the numbers which are to be added. These denominations are added in the manner described above. At the end of this sector, in the sub-sector $187^{n-1}$, is an additional pulse 259 on signal track 182. This pulse will now be sensed by signal head 196 and amplified by amplifier 260. Through lead 261 it arrives at the gate 212, whereby this gate is rendered inoperative and a renewed sensing at the starting signal 214 is prevented. Simultaneously this pulse, through the leads 262, 263 and 264, reaches the gates 218, and 203 and 220, whereby said gates are returned to their initial positions. The sector $186^n$ is not used for computation, but during this time period, control and other functions may be made effective.

If with the device described above, a subtraction has to take place, switch 206 will be switched over from switching position $a$ to switching position $b$. After contact 211 has been closed by a control device, the computation process described above takes place. By switching over contact 206 from switching position $a$ to switching position $b$, the counting stage 201 now receives through amplifier 204 the pulses $265^1$–$265^{n-1}$ recorded in storage track 185. These pulse groups represent a value complementary to the digit values represented in storage track 175 in the respective sectors, namely the complements to "9" of those values. The pulses are sensed by signal head 192 and are fed through the contact 206 in switching position $b$ to the amplifier 204. The further computation process takes place in the same manner as described above. By record it is possible to effect a subtraction in the form of an addition of one digit value to the complement of a second digit value. This is effected according to the following computation scheme.

```
  005738      005738
 -002593    +997406
  ------    -------
 +003145    1003144
             +⌞____1
             -------
            +003145
```

As shown, the subtraction of the number 2593 from the number 5738 gives a positive result 3145. With the computation device described above, this result is reached by the number 5738 being added to the number 997406 which is the complementary value of the number 2593. As an example, a computation device with six denominations input capacity may be considered. The result of the addition 5738 + 997406 results in 1,003,144. As the As an example, a computation device with six denominations, the digit "1" in the highest denomination of the number 1,003,144 occurs at a time after sector $186^{n-1}$ has already passed the sensing position, i.e. at a time at which the pulse 259 has already been sensed by signal head 196 and the real computation process has already been switched off. The above-mentioned digit "1" has generated a pulse on lead 231 at the output of counting stage 201 which has made operative the gate 228, through the two gates 227 and 220. It is thus possible to conduct the pulse $221^1$ recorded directly after the pulse 259, and which was sensed by signal head 190 and amplified by amplifier 223, through the lead 236 and the gate 228 to the lead 260 and from there to the counting stage 201.

Simultaneously the pulse 259 arrives through lead $261b$ to the gate 262 whereby said gate is made operative. The gate $262b$ is connected in parallel with the gate 212 which was made inoperative by pulse 259 and allows the renewed sensing of the pulse 214 to start another computation process. During this second computation process, the tracks 175 and 185 have no recordings, as these tracks will have been erased after the first sensing by an erasing device not shown. Only an addition of the pulse which occurred in the end at lead 261, with the result recorded in the respective one of the tracks $176^{1-n}$ takes place. The last partial operation of the preceding computation is thereby effected and the effective results will be stored on the corresponding one of the tracks $176^{1-n}$. If the result of the subtraction was smaller than "0", i.e. a negative result, then no last pulse occurs on lead 261 and the computation is completed after one rotation of drum 177 as shown by the following example:

```
 006743     006743
-003271   +091728
 ------   -------
-001528    998471      --------    -001528
```

The result occurs in this case as a complementary value and will also be stored within track $176^{1-n}$ as a complementary value. The change-over from the complementary value into the direct value takes place in known manner during the printing process not shown here.

Figure 12:
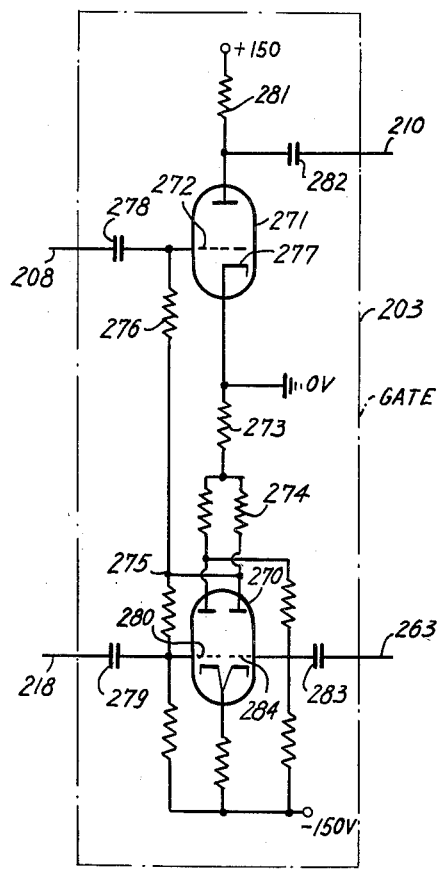
FIGS. 12 and 13 are detailed diagrams of switching units included in FIG. 11.
Figure 13:
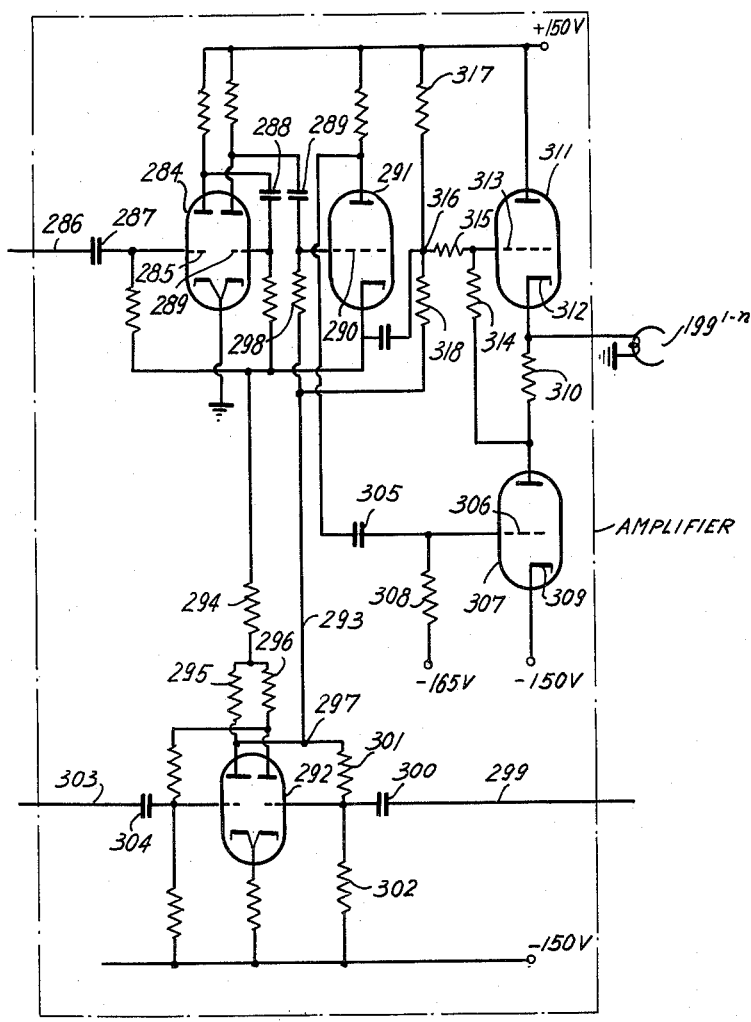

FIGS. 12 and 13 show one of the gates, for instance the gate 203, and the recording amplifier 246. The other amplifiers used in FIG. 11 are basically of the same structure as those used in FIG. 3. The counting stage 201 is basically of the same structure as the counting stage 24 shown in FIG. 10. The two double triodes 127 and 128 are omitted. Instead of the counting stage shown in FIG. 10 in both devices according to FIGS. 1 and 11, other pulse operated counting means could be used, as for instance Dekatrons or counting chains in the form of electronic chains or magnetic core chains and so on.

The gate 203 shown in FIG. 12 includes the double triode 270 and the triode 271. The double triode 270, is a flip-flop stage of known structure, whereas the triode 271 is a controllable amplifier. The controllable amplifier is connected with the flip-flop in such a way that pulses which are conducted through lead 208 to the grid 272 of triode 271, are either blocked by this triode or are amplified by it. This takes place in dependence on the switching position of the flip-flop, i.e. in dependence on which of the systems of double triodes 270 is conductive.

The control of the flip-flop is effected by positive pulses which are applied to the two leads 218 and 266 alternately. In the initial position of the flip-flop the right-hand system of the double triode 270 is conductive, i.e. a voltage drop exists across the common resistor 273 and anode resistor 274. The lead point 275 is thus considerably negative with respect to ground and therefore also grid 272, which is connected through grid resistor 276 with lead point 275. The negative bias at grid 272 is such that positive pulses which are applied through lead 208 and capacitor 278 to the grid 272, cannot raise the grid to a potential higher than the cut-off voltage of the triode 271, so that the triode 271 remains non-conducting.

If now a positive pulse is delivered through lead 216, then this pulse reaches the grid 280 of the triode 270, through capacitor 279, and increases the voltage at this grid to such an extent that the flip-flop is switched over and the left-hand system of the double triode 270 becomes conductive. The right-hand system is then non-conducting and at lead point 275 there is then a voltage drop relative to ground potential which corresponds to the voltage drop across the common resistor 273. The common resistor 273 is such that the voltage drop is just below the cut-off voltage of the triode 271. It is thus possible that positive pulses which arrive at grid 272 from lead 208 through capacitor 278, may increase the bias at this grid above the cut-off voltage, so that an increase of the anode current occurs in tube 271. Negative voltage pulses are provided by the anode across resistor 281 which are conducted through capacitor 282 to the output lead 210. If a positive pulse arrives at lead 263, it reaches the right-hand grid 284 of the double triode 270 through capacitor 283 whereby the flip-flop is returned to its initial position and lead point 275 becomes more negative. The triode 271 is thus held non-conducting.

FIG. 13 shows a controllable record amplifier 246. This amplifier includes a double triode 284, to the left-hand grid 285 of which pulses are conducted from lead 286 through capacitor 287. These pulses will be amplified in the left-hand system of double triode 284 and are fed through capacitor 288 to the right-hand grid 289 of double triode 284.

After the signals have been amplified in the right-hand system of the double triode 284, they are fed through capacitor 289 to the grid 390 of the triode 291. The triode 291 may be controlled by the flip-flop which includes the double triode 292. The control is effected in such a way that in accordance with the switching position of the flip-flop the voltage of the control lead 293 may be altered, i.e. the voltage at this lead 293 is either so negative that the pulses arriving through capacitor 289 cannot increase the grid voltage at grid 290 above the cut-off voltage of the triode 291, and are blocked; or lead 293 is less negative so that positive pulses which enter the grid 290 through capacitor 289, may increase the bias of this grid to a potential between the cut-off voltage and zero, so that these pulses may be amplified by the triode 291.

The control effect of the flip-flop, the switching operation of which must be presumed as known, is based upon the fact that a voltage drop occurs across the common resistor 294 and the anode resistors 295 and 296, so that the anodes of the double triode 292 become alternately less or more negative with respect to ground potential in dependence on the switching position of the flip-flop. The output lead of the flip-flop may be in a switching position such that the left-hand system of the double triode 292 is conductive. Then there is a voltage drop through the common resistor 294 and also through the anode resistor 295. Both voltages add together and a very large negative voltage drop results on lead point 297, which is made effective through grid resistor 298 at grid 290 of the triode 291.

If a positive pulse is then conducted through the lead 299 and the capacitor 300 to the right-hand grid of the double triode 292, the flip-flop is then returned to its initial position and the right-hand system becomes conductive, whereas the left-hand system is blocked. There is at lead point 297 thus less negative bias, as the voltage drop across anode resistor 295 is determined now only by the current of the voltage divider formed of the two resistors 301 and 302. As the current of this voltage divider is very low, there results only a slight voltage drop through anode resistor 295 and at lead point 297 there prevails essentially only the negative voltage, which is generated by the common resistor 294. In this case, the pulses which are conducted to grid 290 are amplified by triode 291. If the flip-flop is to be returned into its initial position, then the left-hand grid of the double triode 292 receives from lead 303 a positive pulse through capacitor 304, whereby the right-hand system is blocked and the left-hand system becomes conductive.

The pulses amplified in triode 291 are fed through capacitor 305 to the grid 306 of the triode 307. This grid will be biassed negatively through resistor 308. The anode of the triode 307 is connected to ground potential through anode/resistor 310 and one of the signal heads $199^{1-n}$, whereas cathode 309 is connected with −150 volts potential. The cathode current at the triode 311 flows through the respective one of the signal heads $199^{1-n}$ since the cathode 312 of this tube is connected to ground potential through the respective signal head $191^{1-n}$. The grid 313 of the triode 311 is connected through grid resistor 314 with the anode of the triode 307. Furthermore, the grid 313 is connected through resistor 315 to lead point 316 which represents the connecting point of the voltage divider formed by the two resistors 317 and 318. The lower end of the resistor 318 is connected with the control lead 293. It is thus possible to deliver to grid 313 a different bias in dependence on the voltage of the control lead 293. If a large negative voltage prevails at control lead 293, which corresponds to a blocking of triode 291, then the voltage at grid 313 also becomes negative through resistor 315, so that the anode current through tube 311 will be practically zero.

If, on the other hand, control lead 293 receives less negative bias, then the grid 313 also becomes less negative with reference to the cathode 312 so that a relatively large anode current may flow. This anode current flows through the switched on signal head $199^{1-n}$ and generates a constant magnetic field. This is useful to erase recordings within the storage track coordinated to the respective signal head. A new recording of pulses by this signal head 199 is effected by the fact that on the control of tube 307 by positive pulses which are conducted to grid 306, the anode current through this tube increases and a large negative voltage drop thus occurs across anode resistor 310. This negative voltage drop is made effective through grid resistor 314 at the grid 313 of triode 311, so that the anode current of this tube is blocked.

Now there flows through the signal head 199 only the anode current of triode 307. As this pulse flows in the opposite direction from the anode current mentioned above with reference to triode 311, this corresponds to a reversal of the polarity of the magnetic field generated by the signal head 199 and effects a reversal of the magnetization of the magnetic layer which is then in the recording position. This magnetization in the other direction of a small part of the storage area corresponds to a recording of a pulse.

Figure 14:
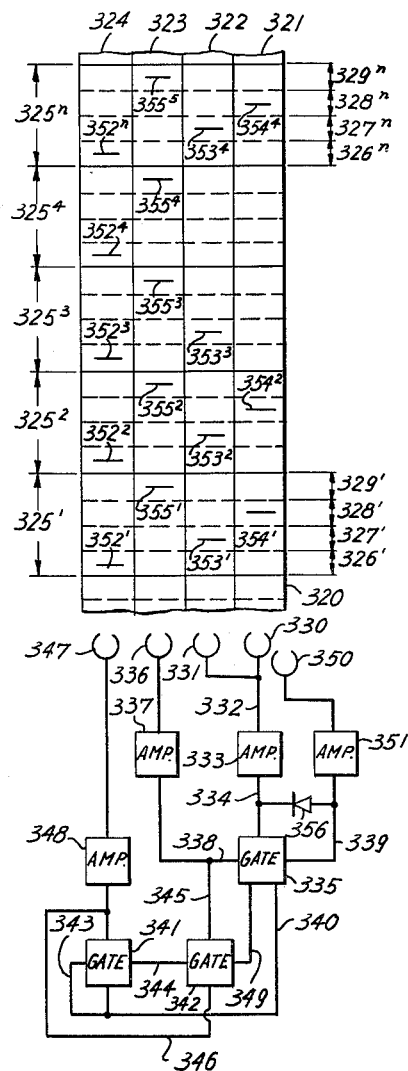
FIG. 14 is a schematic circuit diagram of an arrangement for computing binary numbers.

In FIG. 14 a means for computing binary numbers is shown. The principles of the invention are applicable also to the computation of binary numbers successively by denominations.

The arrangement in FIG. 14 includes a storage drum 320 a part of which is shown. The storage drum 320 includes the two storage tracks 321 and 322 and the two signal tracks 323 and 324. The circumference of the storage drum is divided into sectors $325^{1-n}$, and each of these sectors is divided into four sub-sectors $326^{1-n}$, $327^{1-n}$, $328^{1-n}$, and $329^{1-n}$. Each of these sub-sectors $326^{1-n}$ is so dimensioned that it has a storage capacity of one "bit" of a digit. In the sub-sectors $326^{1-n}$ and $329^{1-n}$ synchronization signals are recorded in the signal tracks 323 and 324. In the sub-sectors $327^{1-n}$ and $328^{1-n}$ the information for computing is recorded in the storage tracks 321 and 322.

On storage track 321 in the sub-sectors $328^{1-n}$ the first number for adding is shown in binary system. This number also can be the result of a preceding computation. In the sub-sectors $327^{1-n}$ of the storage track 322 the second number for computing is recorded.

Pulses representing the different digits in each column of the number to be computed are shifted relatively to each other. The records on the storage tracks 321 and 322 are sensed by the two signal heads 330 and 331 and fed as an interleaved pulse train through lead 332 to amplifier 333. The amplified signals go from there through control lead 334 to the gate 335. The gate controls transmission of pulses which are recorded in the sub-sectors $329^{1-n}$ of signal track 323 and which are sensed by signal head 336 and amplified by amplifier 337. The pulses are then fed from amplifier 337 to the input lead 338 of the gate 335. The circuitry of the gate 335 is such that in dependence on pulses which are fed in by input lead 334 said gate can be opened or closed.

The first position of the gate 335 is such that pulses which are fed in by lead 338 are blocked and the pulses cannot go to output lead 339. The first pulse which is sensed by signal head 330 or 331 and amplified by amplifier 333 passes via lead 334 to the gate 335 and switches it open, so that pulses which are fed in by input lead 338 pass to the output lead 339.

The second pulse on control lead 334 switches the gate 335 back to its initial position so that pulses on input lead 338 are again blocked. Pulses from the gate 341, are fed to gate 335 so as to make it operative. The two gates 341 and 342 are so connected that by a single pulse they are both made operative or inoperative according to the control lead on which this pulse is fed in.

Pulses which are fed in on the control leads 344 and 346 make the gates 341 or 342 operative and pulses, which are fed in on the control leads 345 and 343 make the gate inoperative. The gate 341 has the task of blocking or of transmitting to lead 340 pulses which are recorded in the sub-sectors $326^{1-n}$ on the signal track 322, sensed by signal head 347 and amplified by amplifier 348.

The gate 342 has the task of blocking or transmitting to the control lead 344 pulses which are fed to the lead 349. A pulse is produced in lead 349 when the gate 335 switches over from its operative position to its inoperative position. Because the initial position of the controlled gate 335 is the inoperative one, a pulse is produced in lead 349 when more than one pulse is fed in via control lead 334. That means the pulse in lead 349 is a "carry."

The recording of the result of the computation is effected by signal head 350. Signals are delivered to the signal head 350 from lead 339 through record-amplifier 351. Record-amplifier 351 is constructed on the same principle as that of FIG. 13. The amplifiers 333, 337 and 348 are usual type amplifiers, for instance like that shown in FIG. 3.

The operation of the arrangement is illustrated in the following computation example:

$$\begin{array}{cccccc} 1 & 0 & 0 & 1 & 1 \\ 1 & 0 & 1 & 1 & 1 \\ \hline & 10 & 1 & 1 & 1 \leftarrow 10 \\ 1 & & 1 & 10 & 11 \\ \hline 1 & 0 & 1 & 0 & 1 & 0 \end{array}$$

During one rotation of the drum storage 320 at first the synchronization signal $352^1$ is sensed by signal head 347. The induced pulse is delivered through amplifier 348 to control lead 346 of the gate 342 making it conductive. This pulse is also delivered from amplifier 348 to the input lead of the gate 341 but said gate, in its initial position, is inoperative, so that said pulse cannot pass through the gate 341. Then the two records $353^1$ and $354^1$ are sensed by signal heads 330 and 331. The induced pulses are delivered through amplifier 333 to control lead 334. The first pulse which is induced by record $353^1$ switches over the gate 335 to its operative position and the second pulse, which is induced by record $354^1$ switches this gate back to its inoperative position.

When the gate 335 switches back to its inoperative position, a pulse is produced on lead 349 which is delivered through the gate 342 to the control lead 344 of the gate 341 and switches this gate over to the operative position. In the sub-sector $329^1$ the record $355^1$ is now sensed by signal head 336 and amplified by amplifier 337.

Because the gate 335 is made inoperative by the pulse which is induced by record $354^1$ the pulse which is induced by record $355^1$ cannot pass from amplifier 337 through this gate 335 to lead 339. It passes only from control lead 345 to the gate 342 making it inoperative. Because the pulse from lead 338 is not delivered to lead 339 during this computation, no record is made in sector $325^1$ by signal head 350. This corresponds to the computing example.

Further described functions relate to the addition of the last denomination of the two numbers being computed. The result of this binary subaddition is $$1+1=10$$

The zero of the result corresponds to the non-recording by signal head 350 and the erasing of the record $354^1$ by this signal head. The subresult which is stored in sector $325^1$ on storage track 321 therefore is zero. The "1" of the subresult is the "carry" pulse which was delivered on lead 349. This carry-pulse has made the gate 341 operative so that during the next subaddition a pulse from lead 340 can be fed to the gate 335 switching over this gate to its operative position, that is, position "1." Position "1" is the position in which a pulse can be delivered from lead 338 to lead 339 and therefore a record is made on the corresponding sub-sector on storage track 321. The opposite position, namely when pulses from lead 338 are blocked, corresponds to the position "0" in which no record is effected on storage track 321.

The input of pulses from lead 340 is effected by sensing the signals $352^2$ at the beginning of sector $325^2$. The pulse which is induced by this signal in signal head 347 is delivered through amplifier 348 and the gate 341 to lead 340 switching over the gate 335 to position "1." Simultaneously, this pulse is delivered through lead 346 to the gate 342 switching over this gate to its operative position, so that a "carry" pulse produced during the next subaddition can pass it. Subsequently, the records $353^2$ and $354^2$ are sensed by the signal heads 330 and 331. The pulses induced thereby are delivered through amplifier 333 to control lead 334 of the gate 335.

The first pulse switches this gate back to its inoperative position producing thereby a carry pulse on lead 349. This carry pulse switches over the controllable gate 341 to its operative position. The second pulse, which is induced by record $354^2$ switches over the gate 335 to its operative position, so that now a pulse which is induced in signal head 336 by record $355^2$ and amplified by amplifier 337 can be delivered from lead 338 to lead 339 and from there it passes through the record amplifier 351 to the record head 350.

The record head 350 is offset relatively to sensing head 330 in the direction of movement of the storage drum 320. This means that when the sensing heads 330, 331, 336 and 347 sense the sub-sectors 329, the record head 350 is in record position on sub-sector 328 on storage track 321. Therefore, the pulse which is sensed by sensing head 336 from sub-sector $329^2$ produces a record by record head 350 on sector $328^2$. This corresponds to the position "1" of the storage and to the result in the second denomination of the above computation example. The pulse from lead 338 is delivered simultaneously to control lead 345 of the gate 342, switching over this gate to its inoperative position, so that a pulse which is produced on lead 349 cannot pass this gate 342. The pulse on lead 349 is produced, when the pulse from lead 339 through diode 355 is delivered to the control lead 334 of the gate 335, switching back this gate to its inoperative position. The pulse produced in this manner in lead 349 is not a real carry pulse and is not to be delivered to the gate 341.

The blocking of this pulse by the gate 342 is effected in that the gate 335 switches over a little slower than does the gate 342, so that this gate is inoperative when the pulse on lead 349 is produced. Now, at the beginning of sector $325^3$ the record $352^3$ will be sensed and the pulse thus induced will be delivered through amplifier 348 to the gate 341. This gate is made operative by the first pulse on lead 349 during sector $325^2$ and therefore the pulse from amplifier 348 can pass this gate 341 and come through lead 340 to the gate 335 switching over this gate to its operative position. This corresponds to the carry which was effected on the previous subaddition.

Simultaneously, the gate 341 is switched over to its inoperative position by this pulse, which is delivered to this gate through the control lead 343. The pulse which is delivered from amplifier 348 to the gate 341 is also fed through lead 346 to the gate 342, switching over this gate to its operative position, so that a carry pulse, which could be produced during the next subaddition can pass the gate 342 to the gate 341. During this next subaddition, the record 353 is sensed by signal head 331 and the induced pulse is delivered through amplifier 333 to the gate 335. The initial position of this gate is the operative position because in the previous subaddition, there was a carry pulse which made the gate 335 conductive.

The pulse which is effected by record $353^3$ switches back the gate 335 to its inoperative position, so that on lead 349 a carry pulse is produced which is delivered through the gate 342 to the control lead 344 of the gate 341, thereby opening it. The record $355^3$ is then sensed by signal head 336 and the induced pulse is delivered through lead 338 to the gate 335. The gate 335 is in its inoperative position, so that the pulse is blocked. Simultaneously this pulse is delivered through lead 345 to the gate 342 making it non-conductive. At the beginning of the sector $325^4$ the record $352^4$ is sensed and the induced pulse is delivered through amplifier 348 to the gate 341. The gate 341 is in its operative position, so that this pulse can pass it and can pass through the lead 340 to the controllable gate 335 switching it over to its operative position. This corresponds to the carry which was effected by the previous subaddition.

Gate 341 is made inoperative by this pulse which is fed in on lead 343. In the following subaddition, the two digits 0+0 and digit "1" corresponding to the carry of the previous subaddition are to be added. This means that during this time in which the sector $352^4$ is in sensing position, only the pulse which is induced by signal $352^4$ representing the carry-over is delivered to the gate 335 so that this gate is in its operative position and the pulse which is induced by record $355^4$ in signal head 336 can pass the gate 335 and effect a recording by record head 350. This corresponds to the sub-result "1" of this subaddition.

Simultaneously the pulse from lead 339 is delivered through diode 356 to the control lead 334 of the gate 335 switching it back to its inoperative position. The pulse which is produced thereby on lead 349 cannot pass the gate 342. The now following pulse, which is produced by the record $352^n$, is therefore only delivered through control lead 346 to the gate 342 to open it. At the following subaddition of the next denomination of the two numbers which are to be added, the two records $353^4$ and $354^4$ are sensed and the gate 335 will be switched by the pulses induced by these records at first to position "1," and then it is switched back in its inoperative position.

The pulse produced thereby on lead 349 is a carry pulse which is delivered through the gate 342 to the gate 341 making it operative. The following pulse on lead 338, produced by record 355, is blocked by the gate 335, so that in sector $325^n$ no record is made and the sub-result of this subaddition is zero.

Subsequently, in a sector not shown in FIG. 14, the following record $352^{n+1}$ (not shown) will be sensed, delivering thereby a pulse through amplifier 348 to the gate 341 and through it to lead 340. The controlled gate 335 is made operative by the pulse through amplifier 548.

The storage tracks 321 and 322 contain no records in sector $325^{n+1}$ (not shown) so that the gate 335 remains in its operative position and a pulse which is induced by the record $355^6$ (not shown) can pass it and effect a record by record head 350 in sector $325^n$ on the storage track 321. The result of the whole computation is therefore 1 0 1 0 0.

It will be seen that the capacity of such an arrangement is only determined by the capacity of the storage drum 320. Instead of storage drums any other kind of cyclically-sensable storages can be used. Instead of computing binary numbers as described, decimal binary numbers may also be computed.

According to another feature of the invention, several pulse trains of different timings are generated by a cathode ray deflected to different targets repeatedly.

Means may be provided to deliver two pulse trains to the counting means, of which one train has a frequency double that of the other.

There will also be means for selecting the pulses of one-fold frequency within a time period, in which the one indicates the digit value of one digit value to be processed, whereas the pulse train of the double frequency is used, beginning from that time instant indicating the second operand.

The delivery of the pulse trains can be interrupted at predetermined time instants, denomination-wise. Or, alternatively, the delivery of the pulse trains can start at predetermined time instants denomination-wise.

In the former case, the delivery of pulse trains is interrupted or switched from one pulse train to the other at time instants determined by timed signals indicating digit-values. These timed signals may be determined by signals picked up from a cyclic operating storage of other than rotatable magnetic type. Or such signals may be picked up from a storage, the storage elements of which are arranged in horizontal and/or vertical cross-wise connections.

The timed sensing of these storages may be effected by means of electronically or magnetically operated distributing means, making such elements or groups of elements effective in successive cycles.

The delivery of a signal indicating a computation result may be controlled by supplying pulses to the counting means which operate it during the said second step of operation in a denomination in the opposite way, whereby the passing of zero delivers the said timing instant of the result signal.

The computation process may have separate steps for the processing of two digit values including intermediate storage, and it may include one separate time step for erasing a former result.

The operation between record means and computing means will usually take place serially, but it may take place in parallel.

Two or more sets of the counting means may be used in alternating operation, in combination with the record means. In any event, each denomination area of the record means will usually include areas not used for recording but allowing of operating time during processing. For example, a denomination area of e.g. ten sub-division areas can have two sub-division areas for operating time.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim is:

1. Calculating apparatus including a magnetic signal storage drum with a pair of circumferential number storage tracks, each track being divided into a plurality of denominational storage areas for digits of the number, signal transducing means for each track operable to sense the denominational areas of a track sequentially, a counting device having a counting capacity equal to the largest digit value which is to be stored in any one of said denominational areas and operable in response to pulses applied to an input thereof, means responsive to the sensing of a denominational area in each track by said transducing means to apply to the input of said counting device a single train of pulses equal in number to the sum of the digit values stored in said two areas, the pulses representing one digit value being interlaced and staggered in time with those representing the other digit value, means operable to register a carry from said counting device, means operable to generate signals representing the digit value registered by said counting device before sensing of the next pair of denominational areas, and second signal transducing means operable by said generated signals to effect recording of a representation of the registered digit value in one of the denominational areas before sensing of said next pair of denominational areas, whereby the sum of said two numbers is formed in a single sensing of the two numbers.

2. Apparatus as claimed in claim 1, in which each stored digit value is represented by evenly spaced pulses equal in number to such digit value, and in which each signal transducing means includes a magnetic signal sensing head, the signal sensing heads being mounted in spaced relationship round the circumference of said drum so that the pulse trains generated by said heads are interlaced.

3. Apparatus as claimed in claim 1, having a pair of timing signal tracks on said storage drum and a plurality of magnetic signal sensing heads, each head respectively associated with one such track, said sensing heads being operative to produce timing pulses alternately, and a pair of signal gates with a common output line, each gate being controlled by the signals sensed from one of said storage tracks and one of said timing signal tracks.

4. Calculating apparatus including a magnetic signal storage drum with a pair of circumferential decimal number storage tracks, each track having a plurality of denominational storage areas for the digits of the number stored therein, magnetic signal sensing means for each track operable to sense sequentially the denominational storage areas of a track to produce a serial train of pulses representing the stored digits, the pulse train from one of said pair of tracks being delayed by half a pulse time in relation to the pulse train from the other track, a single denomination decimal counter, means for applying said two pulse trains to an input of said counter to cause it to register the sum, denomination by denomination, of the stored digits, a carry registering device operable by said counter, means operable for each pair of denominational areas sensed to generate signals representing the digit value registered by said counter, signal recording means responsive to said signals to effect recording of each registered value in a denominational area of one of said tracks before the sensing of the stored signals corresponding to the denomination of the next greater significance than that of the registered value, and means operable to set said counter to the value registered by said carry registering device subsequent to each value read-out operation.

5. Apparatus as claimed in claim 4, in which each denominational area is divided into first and second parts, the first part of each area containing the stored representation of a digit of one of said numbers, and the second part of such area being used to record a digit registered by said counter, the sensing and recording means for each track including a signal sensing and recording head, respectively, said sensing and recording heads being mounted with a separation in the circumferential direction equal to the length of said first part.

6. A cyclically operable electronic adder-subtractor comprising, in combination, a cyclically sensable rotary signal storage device having endless tracks in the direction of rotation, and successive signal storage areas composed of corresponding storage sectors in each said track for the successive denominations, respectively, of a multi-denominational number, two of said tracks comprising storage sectors for storing in respectively different relative positions therein any digits pertaining to the respective denominations of two multi-denominational decimal numbers, and for storing the results of a calculating operation involving such two decimal numbers; transducing means being arranged to sense the same denomination of both said numbers as appearing in a particular storage area, concurrently in the same sensing cycle and to handle the successive denominations of both of said numbers, as appearing in consecutive storage areas, in successive sensing cycles; a one denomination arithmetic unit; means for feeding to said arithmetic unit signals sensed from said storage sectors where said signals represent during sensing of a particular storage area, digits of the same denominational significance of said two numbers; timing means for controlling the feeding of the signals respectively representing said digits of same denominational significance in such a manner that the signal representing the digit of one number is fed in a staggered time sequence relative to the signal representing the digit of the other number; and recording means operative in each sensing cycle for recording on each storage sector being sensed in such cycle in the place of at least one of the sensed digit value signals the algebraic sum of the pair of digits sensed in that cycle and computed by said arithmetic unit for that denomination.

7. A cyclically operable electronic adder-subtractor apparatus comprising, in combination, a cyclically sensable rotary signal storage device having storage areas arranged consecutively in the direction of rotation for storing number-representing signals thereon; transducing means for sensing said signal storage areas; signal generating means for at least two trains of timing signal pulses, each of said trains being staggered in time with respect to the other; gating means connected with said transducing and signal generating means for passing pairs of number-representing signals, said number-representing signals being sensed from said signal storage areas by said transducing means and each of said pairs of signal representing respectively digits of identical denominations of two numbers recorded in said storage areas, said pairs of digit-representing signals, appearing at the output of said gate means, being staggered in a time sequence corresponding to respective ones of said timing pulses; a one denomination arithmetic unit responsive to the passed signals representing each pair of digits of said numbers of the same denominational significance to generate signals representing the algebraic sum of such digit pairs; and recording means, responsive to said algebraic sum signals, for recording the sum in said storage areas, respectively, before the sensing of the denominationally following digit pair of said numbers, whereby the sum of the two numbers is recorded, denomination by denomination, in the respective storage areas as the sum of said numbers being sensed from said signal storage device by said transducing means in one sensing cycle.

8. An electronic adder-subtractor apparatus comprising, in combination, a rotatable magnetic storage device having a plurality of cyclically sensable signal storage areas thereon arranged consecutively in the direction of rotation and endless tracks extending in said direction, each of said tracks being subdivided in storage sectors respectively determined by said storage areas, and assigned for storing one of the multi-denominational numbers to be processed, with the respective digits of same denominational significance being stored in track sectors of a respective storage area assigned to the particular denomination, wherein for each digit value of a number there is a number of pulses stored equal to the respective value; a plurality of transducing means respectively associated with said tracks for cyclically sensing digit signals from said storage sectors thereof, in succession, in each one cyclical movement of said storage device relative to said transducing means; signal selector means connected with said transducing means for selectively controlling the sensing of pairs of digit signals representing any two digits appearing in identical denominations of said numbers, respectively, from said storage sectors, respectively, during each sensing cycle of said transducing means; signal generating means for generating at least two trains of timing signal pulses wherein the pulses of each one of said trains are staggered in a time sequence relative to the time sequence of the other one of said pulse trains, said signal generating means comprising other endless tracks having permanently stored, in respective storage sectors determined by said storage areas, said timing signal pulses, and sensing means respectively associated with said other tracks for sensing said timing signal pulses therefrom, said sensing means being spaced relatively to each other in the direction of sensing for producing a staggered relation between said trains of pulses; gating means in circuit with said sensing means and transducing means and energizable in response to digit signals sensed by said transducing means and selected for sensing by said selector means, for passing the pulses of two of said staggered signal pulse trains in dependence on said sensed digit signals; a one denomination arithmetic unit for receiving and adding said pulses passed by said gating means; second transducing means and, on said storage device, third endless tracks, subdivided in storage sectors determined by said storage areas, and second transducing means associated therewith for the algebraic sum of said two numbers; and means for transmitting signals representing the algebraic sum of identical denomination, respectively, of said two numbers from the said arithmetic unit to said second transducing means for recording, on said storage device in a storage area assigned to the particular denomination pulses representing the respective value of said sum for each respective denomination, said recorded pulses corresponding to the sum represented by the total of the digit signals sensed from said storage areas, respectively, during the cycle in which the respective denomination was sensed.

9. A cyclically operable adder-subtractor comprising, in combination, a rotatable magnetic storage device having a plurality of tracks subdivided into signal storage sectors arranged successively in the direction of rotation; means for the normal recording of an erasing frequency in a portion of any one of said signal storage sectors on said storage device; second recording means for recording signals in the remaining portion of such storage sectors on said storage device as a sine wave low frequency wherein a selected plurality of said waves represents successive digits, each having a step by step numerical increment of one, the absence of said waves in any one of said storage sectors being symbolic of the digit value of a number being recorded therein; and means responsive to said low frequency waves recorded by said second recording means; for reading out a signal representing a recorded digit value.

10. A cyclically operable electronic binary adder-subtractor comprising, in combination, a cyclically sensable rotary signal storage device having endless tracks in the direction of rotation and successive signal storage areas composed of corresponding storage sectors in each track for storing the successive denominations, respectively, of a multi-denominational binary number therein, at least two of said tracks comprising storage sectors for storing signals representing the digits of at least two multi-denominational binary numbers; other tracks being provided for storing the result of a calculation; transducing means for cyclically sensing said signal storage sectors and sensing at least two multi-denominational binary numbers for readout in each sensing cycle, each such cycle being sub-divided into sequential periods of signal sensing, each period corresponding to one of the denominations, respectively, of the largest number that is to be processed in said electronic adder-subtractor, said transducing means being arranged to sense identical denominations of both said numbers, respectively, concurrently within the same sensing cycle period; a one denomination arithmetic unit for computing and storing signals sensed from said storage sectors, said signals stored in said unit representing digit values of the numbers produced as a result of an arithmetic operation and being of the same denominational significance as the digit values used in such operation; feeding means for transferring, to said arithmetic unit, the signals being sensed from said storage sectors; recording means connected with said feeding means and operative in each sensing cycle for recording on said storage device the digit signals appearing at the output of said arithmetic unit; means for producing a time displacement of said signals sensed in each sensing cycle of said transducing means whereby one of said sub-divided sequential periods of sensing is further divided resulting in two interlaced pulse sequences having characteristic time displacements, the first one of said interlaced time displacements being that time interval wherein the digit values of identical denominations, respectively, are being sensed from said storage sectors by said transducing means and the other of said interlaced time displacements being that time interval wherein the algebraic sum of the pair of digits sensed in one sensing cycle, is transmitted from said arithmetic unit, in the form of binary signal pulses representing the digit value of the algebraic sum computed by said arithmetic unit for the respective denomination, by said feeding means to said recording means, for rendering thereby said recording means effective to record, within one sensing cycle a number signal, representing the algebraic result computed by said arithmetic unit in the same positional notation on said signal storage area where at least one of said sensed number signals was stored prior to being sensed and computed.

11. A cyclically operable electronic adder-subtractor comprising, in combination, a cyclically sensable rotary magnetic storage device provided with a plurality of storage tracks, a first group of tracks being assigned for storing number signals, representing in successive arrangement successive denominations of a multi-denominational decimal number, each track of said group being divided into a plurality of denominational storage sectors; a plurality of transducing means respectively associated with said tracks for cyclically sensing said storage sectors of said first tracks, respectively, in a sensing cycle, all of the storage sectors of a track being sensed in one revolution of the said storage device; means for generating, under control of the transducing means associated with two of said first tracks two interlaced number representing pulse trains, said interlaced pulse trains being timed in such manner that each pulse of a particular number value in one train occurs between the pulses of the same and the next higher number value of the other train; a pulse counter for registering and counting the pulses furnished by said generating means; a memory register for storing the individual pulses registered and counted by said counter, said memory register combining, after storage, said individual pulses into a pattern of pulses which may be sensed by said transducing means for cyclical readout; recording means, operative in each sensing cycle, to readout and record in another one of said tracks the sum value accumulated in said counter during such cycle, said recording means being interconnected with said counter to be effective to restore said counter to zero, within that cycle, upon completion of the cyclical readout and recording thereof; and means operative in each sensing cycle for registering in said counter, after it has been restored to zero, any signal produced as a result of an arithmetic operation on one denomination of two of said numbers provided that the algebraic sum of said two digits stored in said memory register exceeds the base of at least one of said multi-denominational numbers.

References Cited in the file of this patent

UNITED STATES PATENTS

| | | |
|---|---|---|
| 2,564,403 | May | Aug. 14, 1951 |
| 2,609,143 | Stibitz | Sept. 2, 1952 |
| 2,701,095 | Stibitz | Feb. 1, 1955 |
| 2,767,908 | Thomas | Oct. 23, 1956 |
| 2,796,596 | Kenosian | June 18, 1957 |
| 2,887,269 | Reisch | May 19, 1959 |

FOREIGN PATENTS

| | | |
|---|---|---|
| 731,140 | Great Britain | June 1, 1955 |
| 731,797 | Great Britain | June 15, 1955 |
| 760,752 | Great Britain | Nov. 7, 1956 |